United States Patent Office 2,707,819
Patented May 10, 1955

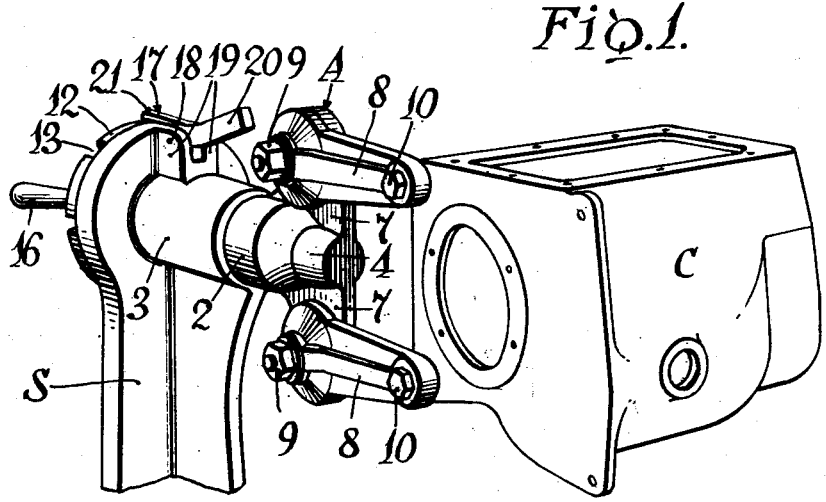
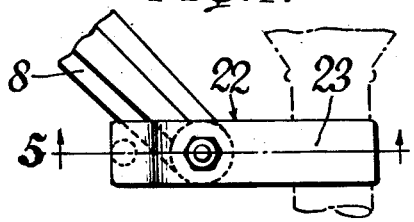
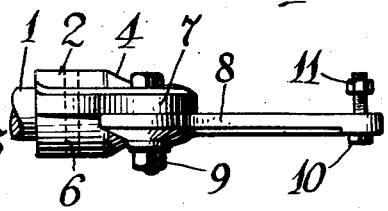
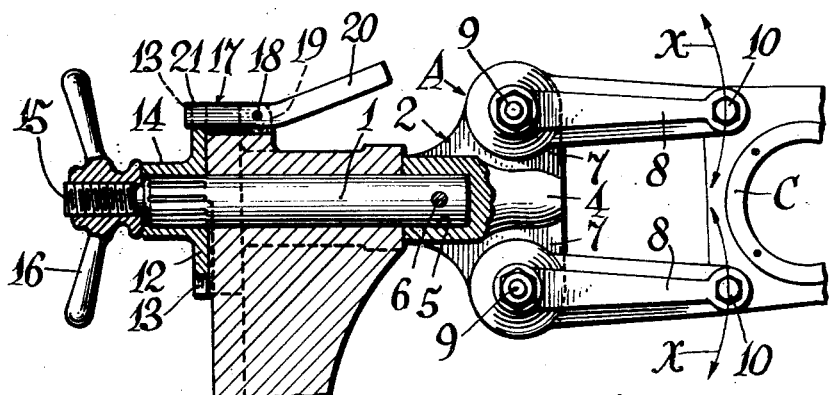
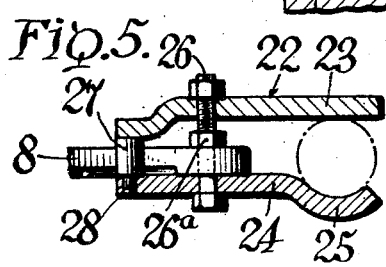
INVENTOR.
Grant F. Silliman,
ATTORNEY.

2,707,819

WORK SUPPORTING ADAPTER FOR USE WITH MOTOR STANDS

Grant F. Silliman, Arcade, N. Y., assignor to Manufacturers and Traders Trust Company, a corporation of New York, and Jack A. Ahern and David D. Nash, all of Buffalo, N. Y., as executors of the estate of Kirke R. Wilson, deceased Continuation of application Serial No. 106,309, July 22, 1949. This application April 15, 1954, Serial No. 423,503

1 Claim. (Cl. 29—289)

This application is a continuation of my application, Serial No. 106,309, filed July 22, 1949, now abandoned.

In sundry repair and assembly operations in connection with parts of automobiles and other vehicles driven by internal combustion engines upright standards are employed which carry "adapters" for the direct support of the "work" i. e. the part requiring repair or assembly operations. The standards project from a supporting base which may be directly attached to the floor or, for the purpose of portability, to a roller mounted platform and at their upper ends have provision for the mounting of the adapters, the unit so characterized being designated as a "motor stand," although the part upon which work is to be done may be any part of the automobile or vehicle which may be supported by the motor stand, for example, among numerous other parts, the cylinder block, the transmission casing and the differential casing. The adapter comprises a horizontal shank which is supported by the standard at its upper end and means carried by the shank for direct supporting attachment to the work, provision being made for the angular adjustment of the part supporting means about the axis of the shank whereby the work may be supported at any angle best suitable to facilitate the particular job.

Heretofore the work supporting means of the adapter has been individually fashioned with regard to the support of a particular part whereby the adapters have severally accorded with the individual characteristics of the part to be repaired and also with the individual designs, in respect to such part, of the several automobile manufacturers. It follows that for each motor stand a multiplicity of adapters has been required, namely a number ranging from at least ten to twenty or more, in accordance with the requirements of the particular automobile repair shop or garage. A substantial increment of purchase and maintenance expense has been imposed by the necessity for a multiplicity of adapters, i. e., as to varieties, adapters sufficient for the various parts of automobiles as made in varying designs by different manufacturers, and, as to maintenance, in a number sufficient for an adequate supply which enables any particular adapter to be immediately available and which will involve immediate compensation for breakage or for losses due to sundry other causes. Additional expense, from an operating standpoint, has been imposed by the liability of confusion in selecting an adapter appropriate to the particular job or in the attempt on the part of a workman to do the particular job with the wrong adapter.

This invention relates to improvements in adapters for use with motor stands of the character generally described and its object is to provide an adapter which will be universal, so to speak, in its capacity for cooperation with the various parts of motor vehicles which may be supported by the motor stand for the purposes of repair or assembly operations. Thus the adapter of the invention eliminates the necessity, heretofore existing, for a multiplicity of adapters specially fashioned for cooperation with each part to be supported in accordance with the design of that part as made by a particular manufacturer. In this way the adapter of the invention effects very substantial savings in the operational and maintenance expense of repair shops and garages and eliminates the above mentioned liability of confusion. The adapters of the invention may be made in different sizes inasmuch as some of the parts to be supported will be relatively small and light in weight and others will be relatively large and quite heavy. Three sizes of the improved adapters will be sufficient for the needs of all repair shops and garages.

The features of improvement in which the invention consists are directed to the construction of the work supporting means whereby such means may have supporting attachment to any part, regardless of its nature or particular design, that may require repair or assembly operations and which, for such purpose, may be supported by the motor stand.

In the accompanying drawings:

Figure 1 is a perspective view showing the upper portion of the upright standard of the motor stand and the adapter of the present invention mounted at the upper end of the standard with its work supporting means attached to a vehicle part, for example, and as shown in this figure, a transmission casing.

Figure 2 is a central vertical section, with parts shown in elevation, of the upper portion of the standard and the adapter of the present invention as mounted at the upper end of the standard with its work supporting means attached to a transmission casing.

Figure 3 is a plan view of the adapter per se, the uppermost work supporting arm being shown at the same angle of projection, i. e. horizontally forward, in which it is shown in Figures 1 and 2.

Figure 4 is a partial plan view of a work supporting arm and an associated clamping element for direct attaching engagement with the vehicle part.

Figure 5 is a sectional view on the line 5—5 of Figure 4.

The standard S, preferably T-shaped in cross section, is sufficiently indicated by the showing of its upper portion and projects in upright relation from the usual supporting base, illustration of which is deemed unnecessary. The adapter, indicated generally at A, is mounted at the upper end of the standard and includes a horizontal shank 1 which projects at each end beyond the standard S and at one end carries the work supporting means indicated generally at 2. The standard S is provided at its upper end with a horizontal sleeve 3 which serves as a bearing for the shank 1. In the construction shown the shank 1 is mounted for rotatable adjustment in the sleeve 3 and the work supporting means 2 is fixedly mounted upon the forwardly projecting end of the shank 1. The work supporting means 2 includes a body member 4 which is generally in the form of a plate and is provided with a centrally located sleeve 5 which provides a pocket; the forwardly projecting end of the shank fitting within the socket and the plate 4 being fixed to the shank by means of a pin 6 fitted in alining openings in the annular wall of the sleeve and in the shank.

The portions of the plate 4 which project at each side of the sleeve 5 provide a pair of oppositely projecting coplanar ears or lugs 7 integral with the wall of the sleeve 5 and located symmetrically with respect to the axis of the shank. To these ears arms 8 are pivoted, as by bolt fastenings 9, for adjustable movement in a common plane parallel to the common plane of the ears 7. The arms 8 severally project in any appropriate angular relation from the body member 4 and conjointly support the work, either by direct attachment thereto as shown in Figures 1 and 2 or through the intermediary of a suitable clamp as shown in Figures 4 and 5. As shown in Figures 1 and 2 the vehicle part is suitably secured to the outer ends of the arms, for example, by bolts 10 which are held in relation to the work of lock nuts 11. As above pointed out the work supporting means 2 may have supporting attachment to any part which may be supported at the upper end of the motor stand, a transmission casing C being shown in the drawing by way of example.

The work supporting means 2 may be angularly adjustable about the axis of the shank 1 and such adjustment may be conveniently provided for, as in the prior individual adapters, by mounting the shank for rotatable adjustment in the sleeve 3 and by fixing the work supporting means 2 to a projecting end of the shank. The work supporting means may be held against displacement from any angular position to which it is adjusted by the latching device heretofore used with the prior individual adapters. This device includes a plate 12 of disc outline which is formed with a series of suitably spaced peripheral notches 13 and is also formed with a central collar 14 to fit over the rearwardly projecting portion of the shank 1, the collar 14 being suitably splined to the shank 1 and being removable from the shank by an end-wise relative outward movement. The rearwardly projecting portion of the shank terminates in a reduced threaded axial extension 15 which carries a wing nut 16, the hub of the wing nut, when tightened, abutting the collar 14 and thereby holding the plate 12 against the rear face of the standard S. The latching device is completed by a detent lever 17 which is pivoted, as at 18, between a pair of ears 19 formed on and projecting outward from the sleeve 3, the forwardly projecting portion 20 of the lever 17 serving as a finger piece and the rearwardly projecting portion 21 of the lever being engageable with latching effect, as shown in Figure 2, in any one of the peripheral notches 13. In order to effect an angular adjustment of the work supporting means the wing nut 16 is backed off to a suitable extent and the part 21 of the lever 17 is disengaged from the plate 12 whereupon the work supporting means, with the attached vehicle part, may be turned through any desired angular extent in order suitably to reposition the work, the shank 1 and the plate 12 participating in the turning adjustment of the work supporting means. When the work supporting means has been brought to the position desired, and which will accord with the registry of a particular notch 13 with the recess provided between the ears 19, the detent lever 17 is manipulated to engage its projecting portion 21 in such notch, thereby to secure the vehicle part in the particular angular position to which it has been moved.

The arms 8, according to the invention, are independently adjustably movable about their pivots 9 in a common plane, the adjustable setting of the arms being determined by the nature and design of the vehicle part upon which work is to be done. Thus (Figure 1 being considered) the arms 8 may be moved in an upward direction through the same degree or relatively through varying degrees, or similarly moved in a downward direction, or one arm may be moved in an upward direction and the other moved in a downward direction, either arm being so moved through any determined degree, the capacity of the arms for such adjustable movements being sufficiently indicated by the arrows X in Figure 2. By virtue of their capacity for independent angular adjustment in a common plane the arms 8, conjointly, are available for the supporting attachment of any vehicle part, regardless of its nature or particular design, which may be capable of support by the motor stand and upon which repair or assembly work is to be performed.

In many instances, and as shown in Figures 1 and 2, the arms 8 may be directly attached, by the bolts 10 or their equivalent, to the vehicle part upon which repair or assembly operations are to be performed. In such cases the only requirement is that the part upon which work is to be performed have threaded openings in which the bolts may be engaged or otherwise have suitable provision for the supporting attachment of the arms. If these openings or other provisions are not formed in the part as originally manufactured the parts may be appropriately modified in the repair shop or garage. In some cases it may not be desirable or practical that the part have threaded openings to enable its direct attachment to the arms 8. For example it is not desirable that a differential casing have threaded openings or recesses. In the instance of a differential casing, and in various other instances where threaded openings or recesses are not desirable or practical, clamp elements 22 (Figures 4 and 5) may be carried by the arms 8, preferably in independently pivotally adjustable relation.

The clamp elements 22 comprise companion clamping leaves 23 and 24, either of which, e. g. the leaf 24, may have a curved terminal formation, as 25, if necessary to conform to the outline of the parts to be held. The clamping leaves 23 and 24 are adjustably tied together, and at the same time connected to the free end of an arm 8 by a bolt 26, the head of which abuts one clamping leaf and the securing nut of which abuts the other clamping leaf. The bolt 26 passes through the opening in the free end of the arm 8 and the connected clamping leaves, as angularly adjusted as a unit, are held against displacement relatively to the arm 8 by a lock nut 26a. In order that the clamping leaves may exert appropriate clamping pressure and also to prevent their relative pivotal displacement, one leaf, e. g. the leaf 23, is formed at its inner end with an inwardly projecting shouldered pin 27 having a reduced terminal portion 28 which fits in an opening in the inner end of the companion clamping leaf. The arms as provided with the clamp elements are independently adjustable in the manner above explained in order that the adapter may be used for the support of any part, regardless of its nature or particular design, which may best be carried by the clamp elements.

The bolts 10 (Figures 1, 2 and 3) and the clamps 22 (Figures 4 and 5) are devices carried by each arm at its free end for the supporting attachment of the arm to the vehicle part. The adjustable movement of the arms, effected as above explained, suitably locates the two supporting attachment devices with reference to the vehicle part, according to its nature and particular design. The bolt fastenings 9 at once provide pivots for the arms 8 and devices for securing the arms in any relative positions into which they may be adjusted. In effecting the adjustable movement of the arms, as above described, and the attachment of the arms by means of the supporting attachment devices to the vehicle part the nuts of the bolt fastenings are back off sufficiently to permit the easy adjustable movement of the arms. When the arms have been properly positioned the supporting attachment devices are then connected to the vehicle part whereupon the nuts of the bolt fastenings are tightened in order to hold the arms, relatively to the plate 4, against loose play and thereby to minimize any shearing stresses, incident to unbalanced weight of the vehicle part or to the repair or assembly operation which may be performed upon the vehicle part.

I claim:

A work adapter for a work support stand comprising a cylindrical body, a shank axially aligned with said body, said body being bored from one end a distance sufficient to form a socket therein for engagement with one end of said shank, the other end of said shank being mounted for axial rotation on said work support stand, coplanar symmetrical ears projecting from and at opposite sides of said cylindrical body and integral therewith, said ears being in a plane which intersects the axis of said cylinder and extends lengthwise of and in the same direction as the axis of said cylinder, integral coplanar arms pivotally and adjustably connected to and extending from said ears, and means on said arms for connecting said arms with the work.

References Cited in the file of this patent

UNITED STATES PATENTS

| | | |
|---|---|---|
| 1,336,912 | Manley | Apr. 13, 1920 |
| 2,312,914 | Koszeghy | Mar. 2, 1943 |
| 2,448,331 | Staab et al. | Aug. 31, 1948 |
| 2,568,508 | Montague | Sept. 18, 1951 |